United States Patent
Lay

[11] 3,883,623
[45] May 13, 1975

[54] PROCESS FOR CONTROLLING END-POINT DENSITY OF SINTERED URANIUM DIOXIDE NUCLEAR FUEL BODIES AND PRODUCT

[75] Inventor: Kenneth W. Lay, Schenectady, N.Y.

[73] Assignee: General Electric Company, Schenectady, N.Y.

[22] Filed: Oct. 17, 1972

[21] Appl. No.: 298,255

[52] U.S. Cl. ................................ 264/0.5; 176/89
[51] Int. Cl. ............................................ G21c 21/00
[58] Field of Search ............... 264/0.5; 252/301.1 R; 423/261

[56] References Cited
UNITED STATES PATENTS

| | | | |
|---|---|---|---|
| 3,094,377 | 6/1963 | Langrod | 423/261 |
| 3,342,562 | 9/1967 | St. Pierre | 264/0.5 |
| 3,431,329 | 3/1969 | White et al. | 252/301.1 R |
| 3,579,390 | 5/1971 | Paine | 264/0.5 |
| 3,609,095 | 9/1971 | Wyatt | 423/261 |
| 3,683,975 | 8/1972 | Sease et al. | 264/0.5 |
| 3,761,546 | 9/1973 | Wilhelm et al. | 264/0.5 |

*Primary Examiner*—Benjamin R. Padgett
*Assistant Examiner*—Roger S. Gaither
*Attorney, Agent, or Firm*—Jane M. Binkowski; Joseph T. Cohen; Jerome C. Squillaro

[57] ABSTRACT

A process for controlling the end-point density of a sintered uranium dioxide nuclear fuel body and the resulting product. Uranium dioxide powder having a size ranging up to 10 microns is admixed with a precursor to uranium dioxide, such as ammonium diuranate, having an average agglomerated particle size ranging from about 20 microns to 1 millimeter and the mixture is formed into a pressed compact or green body. The precursor to uranium dioxide has a density lower than that of the uranium dioxide powder and is used in an amount which results in discrete low density regions in the green body which range from about 5% to 25% by volume of the green body. The green body is sintered to decompose the precursor and produce a sintered body having discrete low density porous regions which reduce the end-point density of the sintered body by at least 2%. The sintered body has an end-point density ranging from 85% to 95% of theoretical.

4 Claims, 1 Drawing Figure

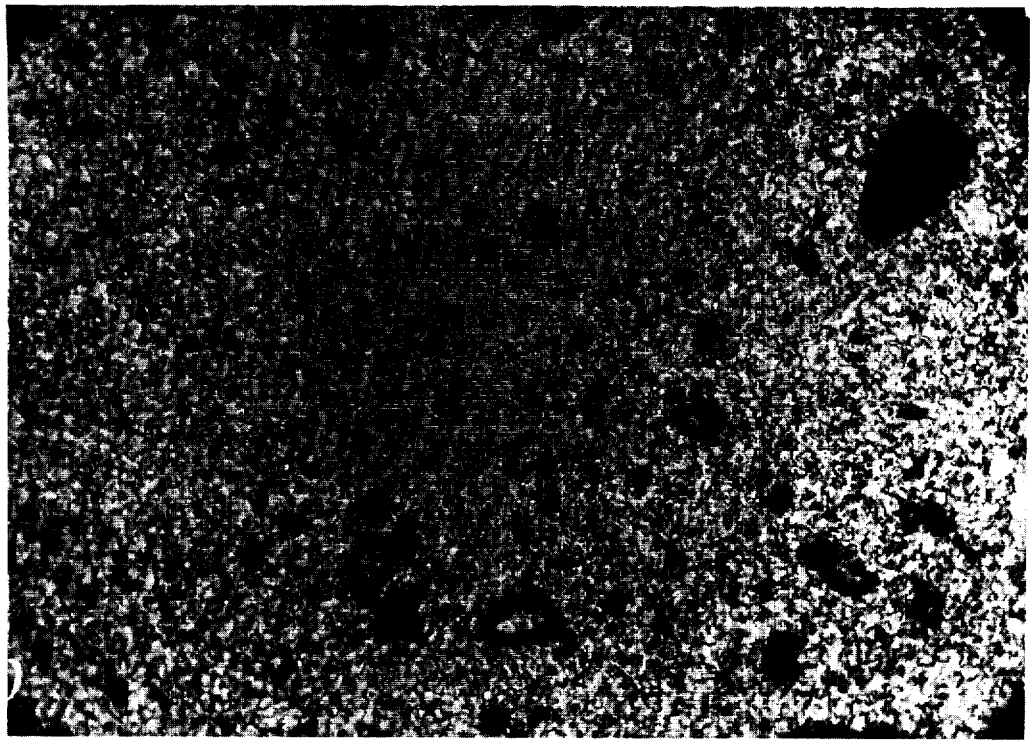

3,883,623

PROCESS FOR CONTROLLING END-POINT DENSITY OF SINTERED URANIUM DIOXIDE NUCLEAR FUEL BODIES AND PRODUCT

The present invention relates generally to the sintering art and is more particularly concerned with a method for controlling the end-point density of a sintered uranium dioxide nuclear fuel body.

Uranium dioxide is produced commercially as a fine, fairly porous powder which cannot be used directly as nuclear fuel. It is not a free-flowing powder but clumps and agglomerates, making it difficult to pack in reactor tubes to the desired density.

The specific composition of commercial uranium dioxide powder also prevents it from being used directly as a nuclear fuel. Uranium dioxide is an exception to the law of definite proportions since "$UO_2$" actually denotes a single, stable phase that may vary in composition from $UO_{1.7}$ to $UO_{2.25}$. Because thermoconductivity decreases with increasing O/U ratios, uranium dioxide having as low an O/U ratio as possible is preferred. However, since uranium dioxide powder oxidizes easily in air and absorbs moisture readily, the O/U ratio of this powder is significantly in excess of that acceptable for fuel.

A number of methods have been used to make uranium dioxide powder suitable as a nuclear fuel. Presently, the most common method is to press the powder into cylindrically-shaped green bodies of specific size which are sintered in a suitable sintering atmosphere at a temperature which can range from about 1000°C to 2400°C with the particular sintering temperature depending largely on the sintering atmosphere. For example, when wet hydrogen gas is used as the sintering atmosphere, its water vapor accelerates the sintering rate thereby allowing the use of correspondingly lower sintering temperatures such as about 1700°C. The sintering operation is designed to densify the bodies and bring them down to the proper O/U ratio or close to the proper O/U ratio.

Although uranium dioxide suitable as a nuclear fuel can have an O/U ratio ranging from 1.7 to 2.015, as a practical matter, the industry has adopted a ratio of 2.00 and suitably as high as 2.015 since it can be consistently produced in commercial sintering operations. In some instances, it may be desirable to maintain the O/U ratio of the uranium dioxide at a level higher than 2.00 at sintering temperature depending largely upon the particular manufacturing process and nuclear reactor. For example, it may be more suitable under the particular manufacturing process to produce a nuclear fuel having an O/U ratio as high as 2.195, and then later treat the sintered product in a reducing atmosphere to obtain the desired O/U ratio.

One of the principal specifications for uranium dioxide sintered bodies to be used as fuel for a nuclear reactor is their density. The actual value may vary but in general uranium dioxide sintered bodies having densities of the order of 90% to 95% of theoretical density are specified and occasionally a density as low as 85% of theoretical. Most pressed uranium dioxide powders, however, will sinter to final densities of about 96 to 98% of theoretical. Therefore, to obtain sintered bodies with lower densities the time and temperature must be carefully controlled to allow the shrinkage of the body to proceed only to the desired value. This is inherently more difficult than the use of a process which goes to completion. Specifically, small variations during sintering can result in large variations or no significant variations in the sintered body of compacted powder depending on a number of factors such as the powder itself, particle size and agglomeration. Generally, however, a change in sintering time such as, for example an hour or two, does not significantly change the density of the final sintered product. Also, when sintered bodies having the desired low density have been attained by carefully controlling sintering time and temperature, it has been found that these sintered bodies, when placed in the reactor, frequently undergo additional sintering within the reactor thereby interfering with proper reactor operation.

A number of techniques have been used in the past to reduce the density of the sintered body other than varying processing conditions. For example, one technique has been to press the uranium dioxide powder, break it up and repress it. The problem with this technique is that the resulting sintered body has large interconnecting pores throughout the body which go out to the surface resulting in a large outside surface area which can absorb into the body significant amounts of gases and in particular water during reactor operation thereby providing a source of corrosion for the fuel cladding. Another technique is to add plastic to the powder, but plastic decomposes to leave carbon and thereby contaminates the fuel.

The present invention is directed to a process for controlling the final or end-point density of a sintered uranium dioxide nuclear fuel body by adding a precursor to uranium dioxide such as ammonium diauranate to the uranium dioxide powder before pressing into a green body. This addition results in discrete low density porous regions in the sintered body which correspond to the ammonium diuranate regions in the green body. The end-point density of the sintered body is, therefore, a function of the amount of ammonium diuranate added.

As a result of the present process, the end-point density of the sintered body is set independently of time and temperature. In this way sintering can be done essentially to completion and the problems of process control simplified. Specifically, deviations in sintering time or temperature do not result in deviations in the final or end-point density. In addition, a sintered body having the desired low density is attained in a reproducible manner by controlling the amount of precursor used. The use of the precursor in the present process has no effect on the oxygen to uranium atomic ratio of the sintered body. Also, the present process leaves no contaminants which may affect the nuclear fuel. Another advantage of the present process is that the resulting sintered body does not undergo any significant additional sintering in the nuclear reactor.

In contrast to those sintered bodies which have large interconnecting pores throughout the body, the present sintered body contains discrete low density porous regions, i.e. regions which are non-interconnecting. Since these regions are discrete, they maintain the shape of the sintered body and also do not absorb gases or water into the body which interfere with reactor operation.

Those skilled in the art will gain a further and better understanding of the present invention from the detailed description set forth below, considered in conjunction with the figure accompanying and forming a part of the specification, showing the microstructure (500 times of magnification) of a sectioned polished sintered pellet of uranium dioxide prepared in accordance with the present invention.

Briefly stated, the present invention comprises admixing uranium dioxide powder with agglomerated particles of a precursor to uranium dioxide to substantially disperse the precursor agglomerated particles in the uranium dioxide powder, said precursor agglomerated particles having an average size ranging from about 20 microns to 1 millimeter, forming the resulting mixture into a green body and sintering the green body to produce a sintered uranium dioxide body having discrete low density porous regions and having an end-point density ranging from about 85% to 95% of theoretical density.

As used herein, the terms discrete low density regions or discrete low density porous regions indicate regions that are non-interconnecting and which are contained completely within the body, i.e. each such region being surrounded by uranium dioxide. In addition, the term end-point density of the sintered body is the density of the sintered body as a whole, i.e. it is the final density of the whole sintered body.

The article of the present invention is a sintered body of uranium dioxide containing a number of discrete low density porous regions which correspond to those low density regions occupied by the precursor in the green body. The specific structure of these discrete low density porous regions may vary but each such region always contains or is associated with an amount of sintered uranium dioxide which is produced when the precursor decomposes leaving an amount of uranium dioxide which densifies during the sintering operation, i.e. this is sintered precursor-generated uranium dioxide. Each discrete low density porous region within the sintered body has a density significantly lower than that of the remainder of the sintered uranium dioxide body, and these regions lower the end-point density of the sintered body by an amount ranging from about 2% to about 13%. The particular reduction in end-point density attained in the sintered body depends on the amount of precursor used. The present sintered body has an end-point density ranging from about 85% to 95% of theoretical, and preferably 90% to 94% of theoretical, and an oxygen to uranium atomic ratio ranging from about 1.7 to 2.015, and preferably, 2.00 to 2.010.

In carrying out the present process, the uranium dioxide powder or particles used generally has an oxygen to uranium atomic ratio greater than 2.00 and can range up to 2.25. The size of the uranium dioxide powder or particles ranges up to about 10 microns and there is no limit on the smaller size. Such particle sizes allow the sintering to be carried out within a reasonable length of time and at temperatures practical for commerical applications. For most applications, to obtain rapid sintering, the uranium dioxide powder has a size ranging up to 1 micron. Commercial uranium dioxide powders are preferred and these are of small particle size, usually sub-micron generally ranging from about 0.02 micron to 0.5 micron.

In the present invention the precursor of uranium dioxide should have certain characteristics. It must be a solid so that it can be mixed with uranium dioxide powder and pressed, and it must have a density lower than that of the uranium dioxide powder with which it is mixed. The present precursor, when heated to its decomposition temperature, decomposes to form uranium dioxide and by-product gas or gases leaving no contaminants in the fuel. Such decomposition must occur at a temperature at least 100°C below sintering temperature and preferably 200°C to 300°C below sintering temperature. This decomposition is accompanied by a significant or substantial decrease in the volume of the solid phase depending on the particular precursor used thereby leaving low density regions which are significantly or substantially porous. Specifically, the decomposition of ammonium diuranate results in a considerable decrease in the volume of the solid phase leaving a relatively small amount of uranium dioxide and a low density region which is substantially porous. In comparison, $U_3O_8$ decomposes to leave a larger amount of uranium dioxide and a low density region which is not as porous.

Representative of the precursors to uranium dioxide which are useful in the present invention are ammonium diuranate, $U_3O_8$, uranyl nitrate and ion exchange resins which contain uranium. Ammonium diuranate is a common precursor to uranium dioxide powder and is particularly preferred. Upon heating under reducing conditions, it decomposes at about 500°C to form uranium dioxide, water vapor, and ammonia.

Generally, the particles of the precursor to uranium dioxide tend to clump together and agglomerate, and therefore, it is the size of the agglomerate, i.e. agglomerated particles, that is given here. In the present invention, the precursor to uranium dioxide should have an average agglomerate size significantly larger than that of the uranium dioxide powder. Specifically, the precursor should have an average agglomerate size ranging from about 20 microns to about 1 millimeter. This agglomerate size range is used so that when the mixture of precursor and uranium dioxide powder is pressed into a green body, the green body has a structure composed of a substantially uniform matrix of uranium dioxide powder with discrete regions of the precursor. The particular agglomerate size used depends largely on the type of precursor and the degree of uniformity required in the sintered piece or body and how big the sintered piece is. Agglomerates of the precursor to uranium dioxide having a size larger than 1 millimeter may result in low density regions which are too large making the sintered body insufficiently uniform to meet reactor specifications. On the other hand, agglomerates of the precursor having a size significantly less than 20 microns would spread out too much in the uranium dioxide powder to form a mixture which, when compacted, and sintered would densify and not show a density significantly different from that of the sintered uranium dioxide matrix, i.e. such small precursor agglomerates would not result in discrete low density regions which would significantly lower the end-point density of the sintered body.

The amount of precursor used can vary and depends largely on the specific precursor used, the degree of uniformity required in the sintered body and the particular end-point density required in the sintered body. To produce a reduction of about 2% to about 13% in the end-point density of the sintered body, the precursor should be admixed with the uranium dioxide powder in an amount which produces a mixture which, when formed into a green body, results in low density regions in the green body ranging from about 5% to 25% by volume of the green body. The volume fraction of low density regions present in the green body can be determined by a number of standard techniques one of which is as follows:

$V_T$ = total volume of green body comprised of uranium dioxide and precursor $W_T$ = total weight of green body of uranium dioxide and precursor be about 50% dense or about 5 gm/cm³

$\rho_{add}$ = initial or green density of low density regions produced by precursor in green body $MW_{UO_2}$ = molecular weight of uranium dioxide $MW_{add}$ = molecular weight of precursor divided by the number of uranium atoms in the molecule $$\frac{MW_{UO_2}}{MW_{add}} = \frac{\text{weight of uranium dioxide from decomposed precursor}}{\text{weight of precursor added}}$$

$$\rho_f = \rho_{uf} \left\{ \frac{\left[1 + \left(\frac{MW_{UO_2}}{MW_{add}}\right)\left(\frac{W_{add}}{W_{UO_2}}\right)\right]}{\left[1 + \left(\frac{\rho_{ui}}{\rho_{add}}\right)\left(\frac{W_{add}}{W_{UO_2}}\right)\right]} \right\}$$

$\rho_T$ = density of green body of uranium dioxide and precursor $W_{add}$ = weight of precursor $W_{UO_2}$ = weight of uranium dioxide
in mixture of precursor and uranium dioxide used to form green body $\rho_{UO}$ = density of matrix of uranium dioxide alone in green body comprised of uranium dioxide and precursor. This can be determined by forming a green body of the uranium dioxide alone in the same manner and measuring its density and assuming it is the same as that of the matrix of uranium dioxide in the green body comprised of uranium dioxide and precursor. However, this is generally assumed in the art to be about 50% dense or about 5 gm/cm³

$V_{UO}$ = volume of uranium dioxide matrix in green body comprised of uranium dioxide and precursor $V_{add}$ = volume of low density regions produced by precursor in green body $$V_{UO} = \frac{W_{UO}}{\rho_{UO}}$$

$$V_{add} = V_T - V_{UO} = V_T - \frac{W_{UO}}{\rho_{UO}}$$

The particular volume fraction of low density regions in the green body required to attain a particular reduction in end-point density in the sintered body can be determined experimentally. However, the following equation is helpful in determining approximate reductions in end-point density of the sintered body, where $\rho_f$ = final or end-point density of sintered body of present invention containing discrete low density porous regions $\rho_{uf}$ = density of matrix of sintered uranium dioxide alone in the sintered body produced in accordance with the present invention on which $\rho_f$ is being calculated. This is determined by measuring the density of a sintered body produced in the same manner as that on which $\rho_f$ is being calculated but without precursor and assuming that this density is the same as the density of the matrix of sintered uranium dioxide in the body on which $\rho_f$ is being calculated $W_{add}$ = weight of precursor $W_{UO_2}$ = weight of uranium dioxide
in mixture of precursor and uranium dioxide used to form green body $\rho_{ui}$ = initial or green density of uranium dioxide matrix in green body generally assumed in the art to By means of calculations, the approximate weight percent range of precursor which can be used to produce the reduction in end-point density of the sintered body in accordance with the present invention has been determined. Specifically, to attain the reduction in end-point density ranging from about 2 to 13%, ammonium diuranate can be used in an amount ranging from about 1 weight percent to about 10 weight percent respectively, and uranyl nitrate can be used in an amount ranging from about 0.7 weight percent to about 5 weight percent respectively, based on the total mixture comprised of precursor and uranium dioxide.

Generally, amounts of precursor resulting in low density regions in the green body which are significantly lower than 5% by volume of the green body would not be effective in reducing the end-point density of the sintered body significantly. On the other hand, amounts of precursor which result in low density regions significantly in excess of 25% by volume of the green body usually are not suitable since they result in a sintered body which may have a substantial number of interconnecting low density regions and which may cause significant shrinkage or cracking of the sintered body.

In carrying out the present process, the uranium dioxide powder and precursor are admixed, by any technique such as stirring which produces a mixture wherein the agglomerates of the precursor are dispersed substantially uniformly, throughout the uranium dioxide powder matrix. Such a mixture, when pressed into a green body, allows the resulting sintered body to have substantially uniform density across the entire sintered piece. Should the agglomerates of precursor be clumped together in the uranium dioxide powder matrix, the resulting sintered body is likely to have one big hole therein making it substantially non-uniform thereby causing problems in mechanical strength and thermoconductivity and also such a hole is likely to be open to the outer surface of the body.

The resulting mixture of uranium dioxide powder and precursor can be formed into a green body, generally a pellet or cylinder, by a number of techniques such as pressing or extrusion. Specifically, the mixture is compressed into a form in which it has the required mechanical strength for handling and which, after sintering, is of the size which satisfies or is close to reactor specification. The green body can have a density ranging from about 30% to 70% of theoretical, but usually it has a density ranging from about 40 to 60% of theoretical, and preferably, about 50% of theoretical.

The green body is sintered in an atmosphere which depends on the particular manufacturing process. Specifically, it is an atmosphere which can be used to sinter uranium dioxide alone in the production of uranium dioxide nuclear fuel and also it must be an atmosphere which decomposes the precursor to form uranium dioxide. For example, ammonium diuranate decomposes to uranium dioxide on heating in a number of atmospheres such as an inert atmosphere, a reducing atmosphere or a controlled atmosphere comprised of a mixture of gases which in equilibrium produces a partial pressure of oxygen sufficient to maintain the uranium dioxide at a desired oxygen to uranium ratio. On the other hand, $U_3O_8$ requires a reducing atmosphere to decompose to uranium dioxide.

The rate of heating to sintering temperature is limited largely by how fast the by-product gases are removed prior to sintering and generally this depends on the gas flow rate through the furnace and its uniformity therein as well as the amount of material in the furnace. Specifically, the gas flow rate through the furnace, which ordinarily is substantially the same gas flow used as the sintering atmosphere, should be sufficient to remove the by-product gases resulting from decomposition of precursor before sintering temperature is reached. Generally, best results are obtained when the rate of heating to decompose the precursor ranges from about 50°C per hour to about 300°C per hour. After decomposition of precursor is completed and by-product gases substantially removed from the furnace, and this may be determined empirically by standard techniques, the rate of heating can then be increased, if desired, to a range of about 300°C to 500°C per hour and as high as 800°C per hour but should not be so rapid as to crack the bodies.

Upon completion of sintering, the sintered body is usually cooled to room temperature. The rate of cooling of the sintered body is not critical in the present process, but it should not be so rapid as to crack the sintered body. Specifically, the rate of cooling can be the same as the cooling rates normally or usually used in commercial sintering furnaces. These cooling rates may range from 100°C to about 800°C per hour, and generally, from about 400°C per hour to 600°C per hour. The sintered uranium dioxide bodies are preferably cooled in the same atmosphere in which they were sintered.

The invention is further illustrated by the following examples:

EXAMPLE

Uranium dioxide powder having an oxygen to uranium ratio of about 2.16 was used. The uranium dioxide powder ranged in size from about 0.8 micron for its smallest particles to an average agglomerate size of 2.1 microns.

Ammonium diuranate having an average agglomerate particle size of about 105 microns was used.

2.49 grams of uranium dioxide powder were admixed with 0.093 gram ammonium diuranate in air by stirring to substantially disperse the agglomerates of ammonium diuranate in the uranium dioxide powder. The resulting mixture was die pressed in a ⅜ inch diameter steel die under a pressure of 9000 psi to give a green body in pellet form having a density of 40.3% based on the density of uranium of 10.96 gm/cm³. It was determined that the precursor formed low density regions in the green body which comprised 12% by volume of the green body.

2.48 grams of the uranium dioxide powder alone were pressed in the same manner to produce a green body in pellet form having a density of 46.3%.

The two green bodies were placed in a platinum boat which was then placed in an alumina tube furnace which was about 20 inches in length and 1½ inches in diameter. The furnace was platinum wound and electrically heated.

The sintering atmosphere was a mixture of carbon dioxide and carbon monoxide. $CO_2$ and $CO$ of commercial purity were used. The gases were passed through calcium chloride and metered into the furnace by both conventional capillary and thermocouple flowmeters which were set approximately at the desired gas ratio. Specifically, the gases passed from the meters to the sintering furnace, to an oxygen sensor, and then to a bubble blowoff which kept the entire assembly under about 2 inches of water pressure. In this way the oxygen sensor gave a continuous record of the oxygen activity of the sintering furnace atmosphere and was able to detect changes due to furnace outgassing and oxygen release or uptake by the samples.

The $CO_2/CO$ ratio was about 1.6 which gave a partial pressure of oxygen sufficient to maintain the O/U ratio of the uranium dioxide at 2.005 during sintering at the sintering temperature of 1400°C.

The flow of the $CO_2/CO$ gas mixture through the furnace was 150 ml/min. and was begun prior to heating up the furnace. The heat up time to the sintering temperature of 1400°C was 3 hours and 15 minutes. Initially, a heating rate of 260°C per hour was used up to a temperature of 600°C to decompose the ammonium diuranate and assure removal of the by-product gases. Then, the heating rate was raised to 800°C per hour up to the sintering temperature of 1400°C. The furnace was maintained at a sintering temperature of 1400°C for 4 hours. At the end of this time, the power to the furnace was shut off and the sintered pellets were furnace cooled to room temperature in the same atmosphere used for sintering.

The end-point density of each of the sintered bodies, given as percent of theoretical, was determined by a standard technique, i.e. by a differential weight technique by weighing in carbon tetrachloride and in air and calculating the volume from the difference in weight and known density of carbon tetrachloride. This technique for measuring end-point density could be used since the sintered body produced in accordance with the present invention had a substantially continuous outer surface so that any amount of the carbon tetrachloride which may have entered the pores was insignificant or within experimental error.

The end-point density of the sintered body initially formed from uranium dioxide alone was 94.8% whereas the end-point density of the sintered body formed in accordance with the present invention, i.e. initially formed from uranium dioxide and ammonium diuranate, was 91.1%. The low density porous regions then reduced the end-point density of the sintered body by 3.7%.

Sintered pellets of uranium dioxide alone prepared from the same material in the same manner had an O/U ratio of 2.005.

The sintered body formed in accordance with the present invention was sectioned, polished and examined by standard metallographic techniques. A micrograph of the sectioned pellet, magnetized 500 times, is shown in the accompanying FIGURE. The micrograph shows a matrix or the continuous phase of standard sintered uranium dioxide microstructure, i.e. the substantially uniform small grains and small pores. The micrograph also shows the low density porous regions of the present invention as relatively large areas within the matrix indicating where agglomerates of ammonium diuranate were present initially. These regions contain or are associated with sintered precursor-generated uranium dioxide. Where relatively large black spots appear alone, it is believed that the sintered precursor-generated uranium dioxide fell out of these regions in the process of sectioning and polishing the pellet.

What is claimed is:

1. A process for controlling end-point density of a sintered uranium dioxide nuclear fuel body by forming discrete low density porous regions therein comprising the steps of providing uranium dioxide powder having an oxygen to uranium atomic ratio ranging from about 2.00 to 2.25 and ranging in size up to about 10 microns, admixing said uranium dioxide powder with a precursor to uranium dioxide having an average agglomerated particle size significantly larger than that of the uranium dioxide powder and ranging from about 20 microns to one millimeter, said precursor being a solid and having a density lower than that of uranium dioxide, forming the resulting mixture into a green body having a density ranging from about 30% to 70% of theoretical, said green body has a structure composed of a substantially uniform matrix of the uranium dioxide powder with discrete low density regions of said precursor therein, said precursor being used in an amount which results in said discrete low density regions in the green body ranging from about 5% to 25% by volume of said green body, heating said green body to decompose said precursor before reaching sintering temperature, and sintering the body to produce a sintered body having discrete low density porous regions with a density significantly lower than that of the surrounding sintered uranium dioxide, said discrete low density porous regions reducing the end-point density of said sintered body by at least 2%, said sintered body having an end-point density ranging from 85% to 95% of theoretical.

2. A process according to claim 1 wherein said precursor to uranium dioxide is selected from the group consisting of ammonium diuranate, $U_3O_8$, uranyl nitrate, and ion exchange resins containing uranium.

3. A process according to claim 2 wherein said precursor to uranium dioxide is ammonium diuranate.

4. A process according to claim 1 wherein said uranium dioxide powder has a particle size ranging from about 0.02 to 0.5 micron, said precursor to uranium dioxide is ammonium diuranate having an average agglomerated particle size of about 105 microns, said low density regions in said green body comprise about 12% by volume of said body, the density of said green body is about 50% of theoretical, said discrete low density porous regions reduce the end-point density of the sintered body by at least 3% and said sintered body has an end-point density of about 91% of theoretical.

* * * * *